(12) United States Patent
Noda

(10) Patent No.: US 11,795,098 B2
(45) Date of Patent: Oct. 24, 2023

(54) MANUFACTURING METHOD OF POROUS GLASS BASE MATERIAL FOR OPTICAL FIBER

(71) Applicant: Shin-Etsu Chemical Co., Ltd., Tokyo (JP)

(72) Inventor: Naoto Noda, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/189,822

(22) Filed: Mar. 2, 2021

(65) Prior Publication Data

US 2021/0284567 A1 Sep. 16, 2021

(30) Foreign Application Priority Data

Mar. 13, 2020 (JP) ................. 2020-043917

(51) Int. Cl.
*C03B 37/018* (2006.01)
*C03B 37/014* (2006.01)

(52) U.S. Cl.
CPC ...... *C03B 37/01815* (2013.01); *C03B 37/014* (2013.01); *C03B 37/0142* (2013.01); *C03B 37/01413* (2013.01)

(58) Field of Classification Search
None
See application file for complete search history.

(56) References Cited

U.S. PATENT DOCUMENTS

| 5,632,797 A * | 5/1997 | Williams ................. B01D 3/06 |
| | | 261/DIG. 65 |
| 2014/0338400 A1 | 11/2014 | Yamazaki et al. |
| 2019/0241458 A1* | 8/2019 | Sato ................. C03B 37/01815 |

FOREIGN PATENT DOCUMENTS

| JP | 05170472 A * | 7/1993 | ......... C03B 37/0142 |
| JP | 6236866 | 11/2017 | |
| WO | WO-9920574 A1 * | 4/1999 | ......... C03B 19/1438 |

OTHER PUBLICATIONS

JP 05-170472 machine translation, Production of Preform for Optical Fiber, Iinuma et al., Jul. 1993 (Year: 1993).*

* cited by examiner

*Primary Examiner* — Queenie S Dehghan
(74) *Attorney, Agent, or Firm* — GREENBLUM & BERNSTEIN, P.L.C.

(57) ABSTRACT

A manufacturing method of a porous glass base material for optical fiber includes: supplying an organic siloxane raw material supplied from a raw material tank is fed to a vaporizer; mixing and vaporizing the raw material and carrier gas in the vaporizer; and externally depositing $SiO_2$ fine particles through combustion reaction by supplying the mixed gas of raw the material and the carrier gas to the burner in the manufacturing apparatus of porous glass base material for optical fiber. Before starting to supply the raw material to a raw material gas supply pipe of the burner, the burner and the inside of a manufacturing apparatus of porous glass base material for optical fiber are pre-heated by flowing purge gas of 60° C. or higher into the raw material gas supply pipe and supplying combustible gas and combustion supporting gas to the burner.

4 Claims, 2 Drawing Sheets

MANUFACTURING METHOD OF POROUS GLASS BASE MATERIAL FOR OPTICAL FIBER

CROSS-REFERENCE TO RELATED APPLICATION

This non-provisional application claims priority under 35 U.S.C. § 119(a) from Japanese Patent Application No. 2020-043917, filed on Mar. 13, 2020, the entire contents of which are incorporated herein by reference.

BACKGROUND

Technical Field

The present invention relates to a manufacturing method of porous glass base material for an optical fiber using organic siloxane raw material.

Background Art

A preforms for optical fiber is manufactured, for example, by externally depositing $SiO_2$ fine particles by the OVD method or the like on a core base material manufactured by the VAD method or the like and sintering the deposited body. Conventionally, silicon tetrachloride ($SiCl_4$) is widely used as a silicon compound raw material for external deposition of $SiO_2$ particles on the base material.

When $SiCl_4$ is used as the raw material, $SiO_2$ fine particles are produced by flame hydrolysis reaction according to the following Chemical formula.

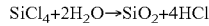

$$SiCl_4 + 2H_2O \rightarrow SiO_2 + 4HCl$$

This reaction produces hydrochloric acid as a byproduct, which is corrosive to metals when mixed with moisture, so care must be taken in the materials used for the manufacturing apparatus and exhaust gas temperature control. Furthermore, the installation of equipment to recover hydrochloric acid from the exhaust and treat the recovered hydrochloric acid will increase costs.

As mentioned above, silicon tetrachloride ($SiCl_4$) is widely used as the silicon compound raw material, but sometimes a halogen-free organosilicon compound that does not contain Cl (chlorine) in its molecule is used as a starting material for $SiO_2$ particles. An example of such halogen-free organic silicon compound is octamethylcyclotetrasiloxane (OMCTS), which is a high-purity organic siloxane available on an industrial scale.

When OMCTS is used as the raw material, $SiO_2$ fine particles are produced by the reaction shown in the following Chemical formula.

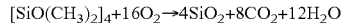

$$[SiO(CH_3)_2]_4 + 16O_2 \rightarrow 4SiO_2 + 8CO_2 + 12H_2O$$

As described above, when the halogen-free organic siloxanes typified by OMCTS are used as the silicon compound raw material supplied to a burner, hydrochloric acid is not discharged. This allows for greater flexibility in handling of materials for manufacturing apparatus and exhaust. In addition, there is no need to install equipment to recover hydrochloric acid and treat the recovered hydrochloric acid, which is expected to reduce costs.

Furthermore, OMCTS is expected to have the advantage that the heat of combustion is very large and the amount of combustible gas such as hydrogen required for combustion can be kept lower than that of the conventional method using $SiCl_4$.

SUMMARY OF THE INVENTION

Problems to be Solved by the Invention

On the other hand, OMCTS has a high standard boiling point of 175° C., which makes it difficult to control the prevention of liquefaction. In particular, immediately after starting to supply the raw material to a burner, the burner tube is not sufficiently warmed up, and the raw material may liquefy in the burner tube and at the burner outlet.

For example, in Japanese Patent No. 6236866, when using organic siloxane raw material with a high boiling point, the burner itself is heated from the outside to prevent liquefaction. However, with this method, a heater area becomes longer when there are multiple burners or when the burners become larger. In addition, when the burner is movable, there is a problem that the handling of the heater becomes complicated.

Another method is to increase the inlet temperature in the burner tube by increasing the heating temperature of a vaporizer and the piping downstream of the vaporizer. However, in this method, if the temperature is raised too high, the raw material OMCTS and the impurity components contained (such as D3 (hexamethylcyclotrisiloxane) and D5 (decamethylcyclopentasiloxane)) will thicken and polymerize, and may precipitate as a polymeric material in the vaporizer, piping, burner, and the like, causing a blockage.

The present invention has been made in view of the above-mentioned problems, and an object of the present invention is to provide a method for manufacturing a porous glass matrix for optical fibers, which can prevent liquefaction of the raw material at the start of supplying the raw material in an organic siloxane raw material typified by octamethylcyclotetrasiloxane (OMCTS).

Means for Solving the Problems

To solve the above problem, the present invention is a method for manufacturing porous glass base material for optical fiber by depositing glass fine particles on a starting material. The method comprises: a step of supplying an organic siloxane raw material supplied from a raw material tank is fed to a vaporizer; a step of mixing and vaporizing the raw material and carrier gas in the vaporizer; and a step of externally depositing $SiO_2$ fine particles through combustion reaction by supplying the mixed gas of raw the material and the carrier gas to the burner in the manufacturing apparatus of porous glass base material for optical fiber. In this method, before starting to supply the raw material to a raw material gas supply pipe of the burner, the burner and the inside of a manufacturing apparatus of porous glass base material for optical fiber are pre-heated by flowing purge gas of 60° C. or higher into the raw material gas supply pipe and supplying combustible gas and combustion supporting gas to the burner to form an oxyhydrogen flame at the burner outlet so that the outer surface temperature of the burner is 60° C. or higher. In this method, the purge gas flowing into the raw material gas supply pipe flows at a flow rate Q that satisfies $Q/V > 350$ $[min^{-1}]$ when the volume in the raw material gas supply pipe from a burner inlet of the raw material gas to the burner outlet is V[L] and the gas flow rate flowing into the raw material gas supply pipe in the burner before the start of raw material supply is Q[SLM].

Effect of the Invention

According to the present invention, liquefaction of the raw material at the start of supply can be prevented in organic siloxane raw materials typified by octamethylcyclotetrasiloxane (OMCTS).

DETAILED DESCRIPTION OF THE EMBODIMENTS

Hereinafter, based on the embodiment, the present invention will be described in more detail.

Figure 1:
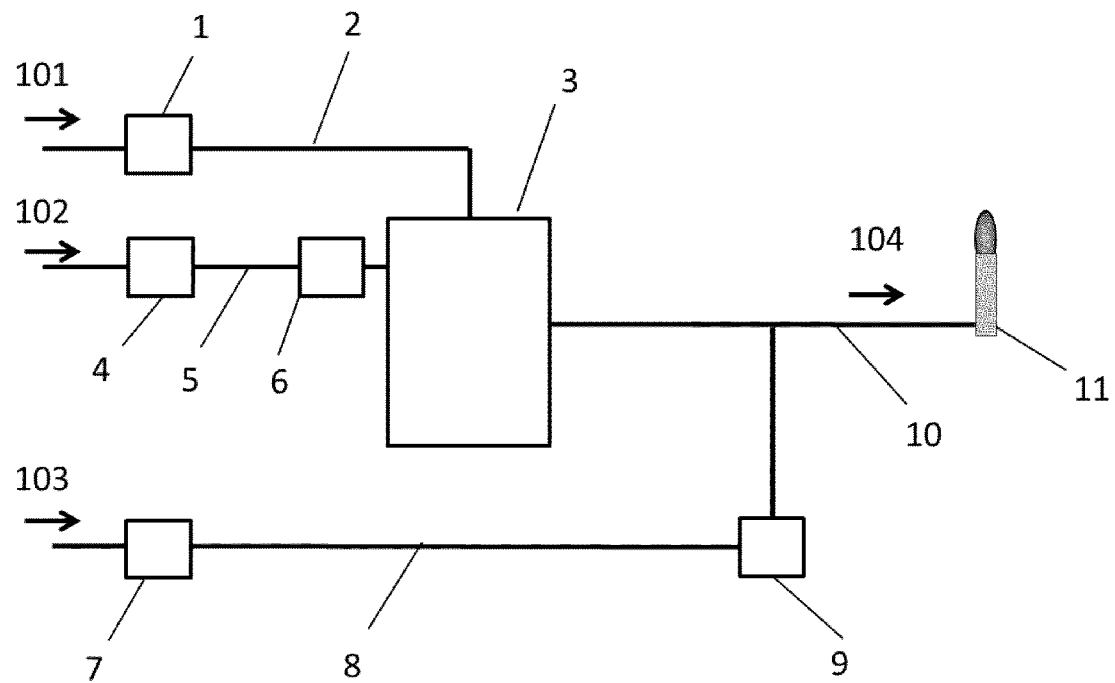
FIG. 1 shows a supply flow diagram around a vaporizer in the manufacturing apparatus of the porous glass preform for optical fiber according to the present embodiment.

FIG. 1 shows a supply flow diagram around a vaporizer according to the present embodiment. A flow rate of a raw material liquid 101 is controlled by a liquid mass flow controller 1, and the raw material liquid 101 is supplied to a vaporizer 3 through a raw material liquid pipe 2. The raw material liquid 101 is made into fine droplets by the carrier gas 102, which is also introduced into the vaporizer 3, and is heated to vaporize the raw material liquid 101 and become a raw material mixed gas 104, which is a mixture of the raw material gas and the carrier gas 102. The flow rate of the carrier gas 102 is controlled by the gas mass flow controller 4, and the carrier gas is supplied to the vaporizer 3 through a carrier gas pipe 5. In order to accelerate the vaporization of the raw material liquid 101 in the vaporizer 3, the carrier gas 102 may be supplied while being pre-heated using a heat exchanger 6. As the carrier gas 102, an inert gas such as nitrogen, argon and helium, oxygen, or a mixed gas of oxygen and an inert gas may be used. The raw material mixed gas 104 is supplied to a burner 11 via a raw material gas pipe 10.

At this time, in order to promote combustion of the raw material gas, oxygen 103 may be further mixed with the raw material mixed gas 104 before being supplied to the burner 11. A flow rate of the oxygen 103 is controlled by the gas mass flow controller 7, and mixed in the raw material gas pipe 10 through a premixed gas pipe 8. To prevent re-liquefaction of the raw material mixed gas 104, oxygen 103 may be supplied while being pre-heated using a heat exchanger 9.

From the viewpoint of efficiently vaporizing the raw material liquid 101 and preventing polymerization of the raw material liquid 101, it is preferable to set the temperature of the vaporizer 2 to a temperature of 160° C. or more and 220° C. or less when OMCTS is used as the organic siloxane raw material. When the temperature is low, the vapor pressure of the raw material liquid is lowered, and when the temperature is lower than 160° C., the vaporization efficiency significantly decreases. When the temperature exceeds 220° C., the polymer derived from the raw material liquid 101 may be deposited. The raw material gas pipe 10 to the burner 11 downstream of the vaporizer should also be set at a temperature of 140° C. or more and 220° C. or less to prevent re-liquefaction and polymerization of the raw material gas in the raw material mixed gas 104. More preferably, the temperature of the vaporizer 3 and the raw material gas pipe 10 should be set to a temperature of 160° C. or more and 190° C. or less. It is preferable that the raw material gas pipe 10 is equipped with a heater to heat it to the desired temperature.

In the manufacturing method of porous glass matrix for optical fibers according to the present invention, a multi-nozzle burner with multiple nozzles or a multi-tube burner can be used as the burner 11.

Figure 2:
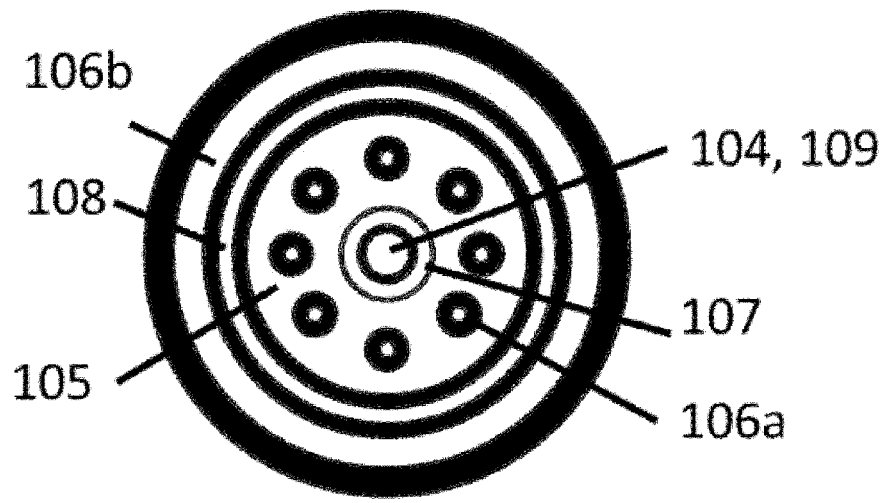
FIG. 2 shows a cross-sectional diagram of the burner in the manufacturing apparatus of the porous glass preform for optical fiber according to the present embodiment.
Figure 3:
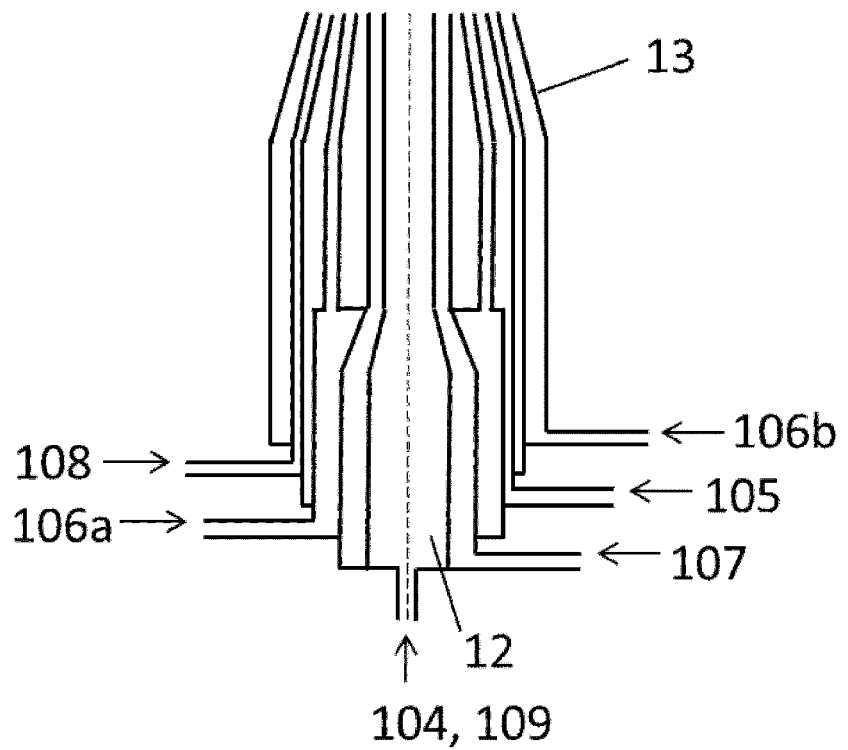
FIG. 3 shows a schematic diagram of the burner in the manufacturing apparatus of the porous glass preform for optical fiber according to the present embodiment.

FIG. 2 shows a cross-sectional diagram of the burner 11 according to the present embodiment. FIG. 3 shows a schematic diagram of the burner 11 according to the present embodiment.

The raw material mixed gas 104 is supplied from the center tube of the burner 11 through the raw material gas supply pipe 12. A seal gas 107 is supplied to the second tube. Oxygen gas for combustion 106a is supplied from small diameter ports. A combustible gas 105 for combustion is supplied to the third tube. A seal gas 108 is supplied to the fourth tube. An oxygen gas for combustion 106b is supplied to the fifth tube, which is the outermost tube. Hydrogen, methane, ethane, and propane can be used as combustible gas for combustion.

In the above-mentioned method for manufacturing porous glass base material for optical fiber, immediately after starting to supply the raw material gas 104 to the burner 11, the raw material gas supply pipe 12 of the burner 11 is not sufficiently warmed up, and the high-temperature raw material mixed gas 104 loses heat to the cold burner 11 and the atmosphere inside the apparatus for manufacturing porous glass base material for optical fiber, which may cause the raw material to liquefy in the burner tube and at the burner outlet.

In the present invention, the temperature of the burner 11 and the apparatus for manufacturing porous glass base material for optical fiber is raised before starting to supply the raw material to the raw material gas supply pipe in the burner 11 to prevent liquefaction of the raw material gas 104 immediately after starting to supply the raw material.

In general, when the inlet temperature of the raw material gas supply tube 12 is $T_1$, the ambient temperature where the burner 11 is located is $T_2$, the tube length of the raw material gas supply tube 12 is L, the gas flow rate through the raw material gas supply tube 12 is Q, the inner diameter of the raw material gas supply tube 12 is $D_1$, the outer diameter of the raw material gas supply tube 12 is $D_2$, the gas specific heat is p, the gas density is d, the thermal conductivity of the raw material gas supply tube 12 is λ, and the convection heat transfer coefficient is C, the thermal resistance R that the raw material gas supply tube 12 of the burner 11 receives is expressed by the following formula.

$$R = \ln(D_2/D_1)/(2 \times \pi \times \lambda) + 1/(C \times \pi \times D_2)$$

The outlet temperature $T_3$ of the raw material gas supply pipe 12 of the burner 11 is expressed by the following formula.

$$T_3 = T_2 + (T_1 - T_2)/\exp(3.6 \times L/(R \times p \times Q \times d))$$

The outer surface temperature of the burner can be used as the environmental temperature $T_2$ where the burner 11 is placed.

In order to prevent liquefaction of the raw material gas 104, it is preferable to set each parameter appropriately to keep the outlet temperature $T_3$ of the raw material gas supply pipe 12 of the burner 11 as high as possible. When OMCTS is used as the raw material gas and the partial pressure of OMCTS is 30 kPa, $T_3$ is preferably 133° C. or higher, and more preferably 153° C. or higher.

As a way to keep the outlet temperature $T_3$ of the raw material gas supply pipe 12 high, it is possible to shorten the pipe length L of the raw material gas supply pipe 12 or reduce the inner diameter $D_1$ of the raw material gas supply pipe 12 and the outer diameter $D_2$ of the raw material gas supply pipe 12. However, it is not easy to change the dimensions of the raw material gas supply pipe 12, since the pipe length L, the inner diameter $D_1$ of the raw material gas supply pipe 12, and the outer diameter $D_2$ of the raw material gas supply pipe 12 are designed with the optimum dimensions according to the size of the porous glass base material and the structure and size of the porous glass base material manufacturing apparatus so that stable $SiO_2$ fine particles deposition can be realized.

Another possible way to keep the outlet temperature $T_3$ of the raw material gas supply pipe 12 high is to increase the inlet temperature $T_1$ of the raw material gas supply pipe 12. However, if the inlet temperature $T_1$ of the raw material gas supply pipe 12 is set too high, the possibility of thickening and polymerization of the raw material-containing components increases.

In the present invention, in order to prevent liquefaction of the raw material gas immediately after the start of raw material supply, purge gas 109 at a high temperature of 60° C. or higher flows through the raw material gas supply pipe 12, and combustible gas 105 and combustion supporting gas 106b are supplied to the burner 11, and the flow rate and time are adjusted so that the outer surface temperature of the burner 11 is 60° C. or higher. Thereby, an oxyhydrogen flame is formed at the outlet of the burner to pre-heat the burner 11 and the inside of the manufacturing apparatus of the porous glass base material for optical fiber. This allows the environmental temperature $T_2$ at which the burner 11 is placed to be kept high, and the outlet temperature $T_3$ of the raw material gas supply pipe 12 immediately after the start of raw material supply can be made high. Here, the temperature measurement point 13 at the outer surface of the burner was the outer surface temperature near the tip of the burner 11, as shown in FIG. 3.

When the volume in the raw material gas supply pipe 12 from a burner inlet of the raw material gas to the burner outlet is V[L] and the gas flow rate to the raw material gas supply pipe 12 of the burner before the start of raw material supply is Q[SLM], purge gas 109 at a high temperature of 60° C. or higher flows through the raw material gas supply pipe 12 to satisfy Q/V>350 [min$^{-1}$]. From the viewpoint of reducing the required pre-heat time, it is more preferable to flow high-temperature purge gas 109 through the raw material gas supply pipe 12 to satisfy Q/V>450 [min$^{-1}$]. This allows the outlet temperature $T_3$ of the raw material gas supply pipe 12 to be raised in advance before the start of raw material supply, and the outlet temperature $T_3$ of the raw material gas supply pipe 12 at the start of raw material supply can also be kept high to prevent liquefaction of the raw material mixed gas 104. In this case, inert gases such as nitrogen, argon, helium, and the like, or oxygen or a mixture of oxygen and inert gases can be used as the purge gas 109. For example, the carrier gas 102 may be supplied from carrier gas pipe 5 as the purge gas 109, or oxygen gas 103 mixed with carrier gas may be supplied from premixed gas pipe 8.

EXAMPLE

Example 1

OMCTS was used as the organic siloxane raw material 101. $N_2$ gas was used as the carrier gas 102. $H_2$ gas was used as the combustible gas 105. Air was used as the sealing gas 107. $N_2$ gas was used as the sealing gas 108. Before starting the supply of OMCTS, an oxyhydrogen flame was formed and pre-heated for 60 minutes under the conditions that the flow rate per burner was 30 SLM for the combustible gas 105, 12 SLM for the oxygen gas 106b, 5.0 SLM for seal gas 107, and 5.0 SLM for seal gas 108. The outer surface temperature $T_2$ of the burner 11 just before the start of OMCTS supply was 65° C.

A mixture of $N_2$ gas and $O_2$ gas was used as the purge gas 109 flowing into the raw material gas supply pipe 12 before starting to supply OMCTS. The flow rate Q of the purge gas 109 was set to 7.0 SLM, the temperature of the raw material gas pipe 10 was kept at 170° C., and the purge gas 109 was supplied to the raw material gas supply pipe 12 through the raw material gas pipe 10. In the burner 11 used, the volume V in the raw material gas supply pipe 12 from a burner inlet of the raw material gas to the burner outlet was 0.01416 L. In other words, Q/V was 494 [min$^{-1}$].

Under the above conditions, OMCTS was started to be supplied to the burner 11, and the liquefaction of OMCTS in the burner tube and at the burner outlet was prevented at the start of OMCTS supply.

Example 2

The same conditions as in Example 1 were used, except that the flow rate Q of purge gas 109 flowing into the raw material gas supply pipe 12 was set to 5.0 SLM (i.e., Q/V was 353 [min$^{-1}$]). As a result, the liquefaction of OMCTS in the burner tube and at the burner outlet was prevented at the start of OMCTS supply.

Comparative Example 1

The same conditions as in Example 1 were used, except that the flow rate Q of purge gas 109 flowing into the raw material gas supply pipe 12 was set to 1.0 SLM (i.e., Q/V was 71 [min$^{-1}$]). As a result, severe liquefaction occurred in the burner tube at the start of OMCTS supply.

Comparative Example 2

The same conditions as in Example 1 were used, except that the flow rate Q of purge gas 109 flowing into the raw material gas supply pipe 12 was set to 3.0 SLM (i.e., Q/V was 212 [min$^{-1}$]). As a result, liquefaction occurred in the burner tube at the start of OMCTS supply.

Comparative Example 3

Before starting the supply of OMCTS, no combustible gas 105 was supplied and no oxyhydrogen flame was formed. Then, at the same time as the supply of OMCTS was started, the supply of the combustible gas 105 was started. The flow rate Q of purge gas 109 flowing into the raw material gas supply pipe 12 was set to 7.0 SLM (i.e., Q/V was 494 [min$^{-1}$]). As a result, severe liquefaction occurred in the burner tube at the start of OMCTS supply. The outer surface temperature $T_2$ of the burner 11 just before the start of OMCTS supply was 27° C.

Table 1 shows the flow rate Q of purge gas 109 flowing into the raw material gas supply pipe 12 before the start of OMCTS supply, the volume V of the raw material gas supply pipe 12, the formation or not of an oxyhydrogen flame before the start of OMCTS supply, and the liquefaction of OMCTS at the start of OMCTS supply.

TABLE 1

|  | Flow Rate of Purge Gas Q[SLM] | Volume of Raw Material Gas Supply Pipe V[L] | Q/V [min⁻¹] | Formation of Oxyhydrogen Flame Before Start Raw Material Supply | Outer Surface Temperature of Burner T₂[° C.] | Liquefaction of Raw Materiall at the Start of Raw Material Supply |
|---|---|---|---|---|---|---|
| Example 1 | 7.0 | 0.01416 | 494 | Formed | 65 | No Liquefaction |
| Example 2 | 5.0 | 0.01416 | 353 | Formed | 65 | No Liquefaction |
| Comparative Example 1 | 1.0 | 0.01416 | 71 | Formed | 65 | Significantly Liquefied |
| Comparative Example 2 | 3.0 | 0.01416 | 212 | Formed | 65 | Liquefied |
| Comparative Example 3 | 7.0 | 0.01416 | 494 | Not Formed | 27 | Significantly Liquefied |

Table 1 shows that it is possible to prevent liquefaction of the raw material mixed gas 104 by flowing purge gas 109 at a high temperature of 60° C. or higher through the raw material supply pipe 12 to satisfy Q/V>350 [min⁻¹] before starting OMCTS supply.

What is claimed is:

1. A manufacturing method of porous glass base material for optical fiber by depositing glass fine particles on a starting material, comprising:
   supplying an organic siloxane raw material supplied from a raw material tank to a vaporizer; vaporizing the raw material while combining the raw material and a carrier gas in the vaporizer; and externally depositing $SiO_2$ fine particles on the starting material through combustion reaction by supplying the combined gas of the raw material and the carrier gas to a burner in a manufacturing apparatus of porous glass base material for optical fiber, wherein
   before starting to supply the raw material to a raw material gas supply pipe of the burner, the burner and the inside of the raw material gas supply pipe of the burner are pre-heated by flowing purge gas of 60° C. or higher into the raw material gas supply pipe and supplying combustible gas and combustion supporting gas to the burner to form an oxyhydrogen flame at the burner outlet so that an outer surface temperature of the burner is 60° C. or higher, and
   the purge gas flowing into the raw material gas supply pipe flows at a flow rate that satisfies Q/V>350[min⁻¹] when the volume in the raw material gas supply pipe from a burner inlet of the raw material gas to the burner outlet in the burner is V[L] and the gas flow rate flowing into the raw material gas supply pipe in the burner before the start of raw material supply is Q[SLM].

2. The manufacturing method of porous glass base material for optical fiber according to claim 1, wherein
   the purge gas flowing into the raw material gas supply pipe flows at a flow rate that satisfies Q/V>450[min⁻¹].

3. The manufacturing method of porous glass base material for optical fiber according to claim 1, wherein octamethylcyclotetrasiloxane (OMCTS) is used as the organic siloxane raw material.

4. The manufacturing method of porous glass base material for optical fiber according to claim 1, wherein a raw material gas introduction pipe from the vaporizer through which the purge gas flows before the start of raw material supply to a burner inlet of the raw material gas is heated and kept at a temperature of 140° C. or higher and 220° C. or lower.

* * * * *